(12) United States Patent
Movsisyan et al.

(10) Patent No.: US 10,140,443 B2
(45) Date of Patent: Nov. 27, 2018

(54) AUTHENTICATION SOURCE SELECTION

(71) Applicant: VMware, Inc., Palo Alto, CA (US)

(72) Inventors: Vardan Movsisyan, Yerevan (AM); Armen Sahakyan, Yerevan (AM)

(73) Assignee: VMWARE, INC., Palo Alto, CA (US)

( * ) Notice: Subject to any disclaimer, the term of this patent is extended or adjusted under 35 U.S.C. 154(b) by 129 days.

(21) Appl. No.: 15/098,290

(22) Filed: Apr. 13, 2016

(65) Prior Publication Data

US 2017/0300683 A1    Oct. 19, 2017

(51) Int. Cl.
*G06F 21/33*    (2013.01)

(52) U.S. Cl.
CPC .................. *G06F 21/33* (2013.01)

(58) Field of Classification Search
None
See application file for complete search history.

(56) References Cited

U.S. PATENT DOCUMENTS

| | | | | |
|---|---|---|---|---|
| 6,957,334 B1* | 10/2005 | Goldstein | .............. | G06F 21/33 713/170 |
| 8,478,878 B2* | 7/2013 | Freimuth | ............ | G06F 9/45558 709/223 |
| 9,325,698 B2* | 4/2016 | Lovmand | ............ | H04L 63/0823 |
| 9,491,155 B1* | 11/2016 | Johansson | ........... | H04L 63/0807 |
| 2001/0011254 A1* | 8/2001 | Clark | ..................... | G06F 21/125 705/59 |
| 2001/0025313 A1* | 9/2001 | Feng | ..................... | G06F 9/505 709/226 |
| 2001/0027527 A1* | 10/2001 | Khidekel | ................ | G06F 21/32 726/9 |
| 2002/0042828 A1* | 4/2002 | Peiffer | .................... | H04L 29/06 709/227 |
| 2002/0107982 A1* | 8/2002 | Teodosiu | .......... | H04L 29/12066 709/245 |
| 2002/0188738 A1* | 12/2002 | Gray | ..................... | G06F 13/385 709/229 |
| 2002/0198993 A1* | 12/2002 | Cudd | ................ | G06F 17/30902 709/225 |
| 2003/0084171 A1* | 5/2003 | de Jong | ................. | G06F 21/33 709/229 |
| 2003/0163737 A1* | 8/2003 | Roskind | .................. | G06F 21/31 726/6 |
| 2003/0233403 A1* | 12/2003 | Bae | .................. | G06F 17/30861 709/203 |

(Continued)

FOREIGN PATENT DOCUMENTS

CN    103326955    *  9/2013

*Primary Examiner* — Piotr Poltorak
(74) *Attorney, Agent, or Firm* — SU IP Consulting

(57) ABSTRACT

An example method is provided for a computing device to select an authentication source. The method may comprise receiving a request to authenticate a user account and determining multiple authentication sources that are capable of processing the request. The multiple authentication sources may be associated with respective performance indicators. The method may also comprise selecting a particular authentication source to process the request, wherein the particular authentication source is selected from the multiple authentication sources based on the performance indicators. The method may further comprise processing the request using the particular authentication source to authenticate the user account.

21 Claims, 6 Drawing Sheets

(56) References Cited

U.S. PATENT DOCUMENTS

| | | | |
|---|---|---|---|
| 2003/0237004 A1* | 12/2003 | Okamura | H04L 63/0272 726/15 |
| 2004/0076154 A1* | 4/2004 | Mizutani | H04L 45/00 370/389 |
| 2004/0078066 A1* | 4/2004 | Ohta | G06F 21/10 607/60 |
| 2004/0103278 A1* | 5/2004 | Abhishek | H04L 63/08 713/160 |
| 2004/0133577 A1* | 7/2004 | Miloushev | G06F 11/1076 |
| 2005/0037734 A1* | 2/2005 | Tanaka | H04M 1/72533 455/411 |
| 2005/0108579 A1* | 5/2005 | Isaacson | G06F 21/31 726/19 |
| 2005/0144234 A1* | 6/2005 | Tanaka | G06F 9/4881 709/205 |
| 2005/0160265 A1* | 7/2005 | Tanaka | H04L 9/3273 713/168 |
| 2007/0079356 A1* | 4/2007 | Grinstein | H04L 63/08 726/2 |
| 2007/0079357 A1* | 4/2007 | Grinstein | G06F 21/629 726/2 |
| 2007/0079369 A1* | 4/2007 | Grinstein | G06F 21/31 726/19 |
| 2007/0079384 A1* | 4/2007 | Grinstein | G06F 21/629 726/27 |
| 2007/0130330 A1* | 6/2007 | Ridel | G06F 11/3495 709/224 |
| 2007/0174898 A1* | 7/2007 | Maes | G06F 21/33 726/2 |
| 2007/0192601 A1* | 8/2007 | Spain | G06F 21/31 713/168 |
| 2007/0234115 A1* | 10/2007 | Saika | G06F 11/2028 714/13 |
| 2008/0307054 A1* | 12/2008 | Kamarthy | H04L 63/065 709/206 |
| 2009/0031033 A1* | 1/2009 | Deng | H04L 63/126 709/229 |
| 2010/0138899 A1* | 6/2010 | Yamamoto | G06F 21/31 726/3 |
| 2011/0004764 A1* | 1/2011 | Stuber | G01D 4/004 713/176 |
| 2011/0013772 A1* | 1/2011 | Roethig | H04N 21/4367 380/200 |
| 2011/0023099 A1* | 1/2011 | Kim | G06F 21/31 726/5 |
| 2011/0119735 A1* | 5/2011 | Higuchi | H04L 63/08 726/3 |
| 2011/0126009 A1* | 5/2011 | Camp, Jr. | H04L 9/0825 713/168 |
| 2012/0140276 A1* | 6/2012 | Haba | G06F 3/1206 358/1.15 |
| 2012/0311342 A1* | 12/2012 | Nuzzi | G06F 21/31 713/182 |
| 2015/0016406 A1* | 1/2015 | Holostov | H04W 12/06 370/329 |
| 2015/0150084 A1* | 5/2015 | Kiperberg | G06F 21/44 726/3 |
| 2015/0207185 A1* | 7/2015 | Kono | H01M 10/4257 320/107 |
| 2016/0028797 A1* | 1/2016 | Van der Merwe | H04L 29/12066 709/224 |
| 2016/0088119 A1* | 3/2016 | Iikura | G06F 9/5072 709/203 |
| 2016/0098231 A1* | 4/2016 | Manohar | G06F 3/1288 358/1.15 |
| 2016/0214391 A1* | 7/2016 | Ward | G03G 15/0863 |
| 2016/0266916 A1* | 9/2016 | Morelli | G06F 9/4445 |

\* cited by examiner

310

*Benchmark information*

| Authentication Type 312 | Authentication Source 314 | Performance indicator (e.g., duration) 316 |
|---|---|---|
| Active Directory | AD1 (DC1) | 120 seconds |
| Active Directory | AD1 (DC2) | 60 seconds |
| Active Directory | vIDM1 | 10 seconds |

320

*Priority List*

| Priority level 322 | Authentication Type 324 | Authentication Source 326 |
|---|---|---|
| 1 (highest) | Active Directory | vIDM1 |
| 2 | Active Directory | AD1 (DC2) |
| 3 (lowest) | Active Directory | AD1 (DC1) |

Fig. 3

AUTHENTICATION SOURCE SELECTION

BACKGROUND

Unless otherwise indicated herein, the approaches described in this section are not admitted to be prior art by inclusion in this section.

Identity management refers broadly to the administration of individual identities (e.g., users) within a system. Identity management ensures that only authenticated users are able to log onto to an application, and only authorized users are able to access resources according to various policies. Prior to allowing an authenticated user to access a particular resource, access control is performed to determine whether the user is authorized to access the resource. In practice, multiple authentication sources may be used to handle authentication requests, allowing more choices and convenience for users to access relevant systems. However, integration of multiple authentication sources creates new problems.

BRIEF DESCRIPTION OF DRAWINGS

FIG. 3 is a schematic diagram illustrating example performance indicators of the authentication sources in the example in FIG. 1;

DETAILED DESCRIPTION

Figure 1:
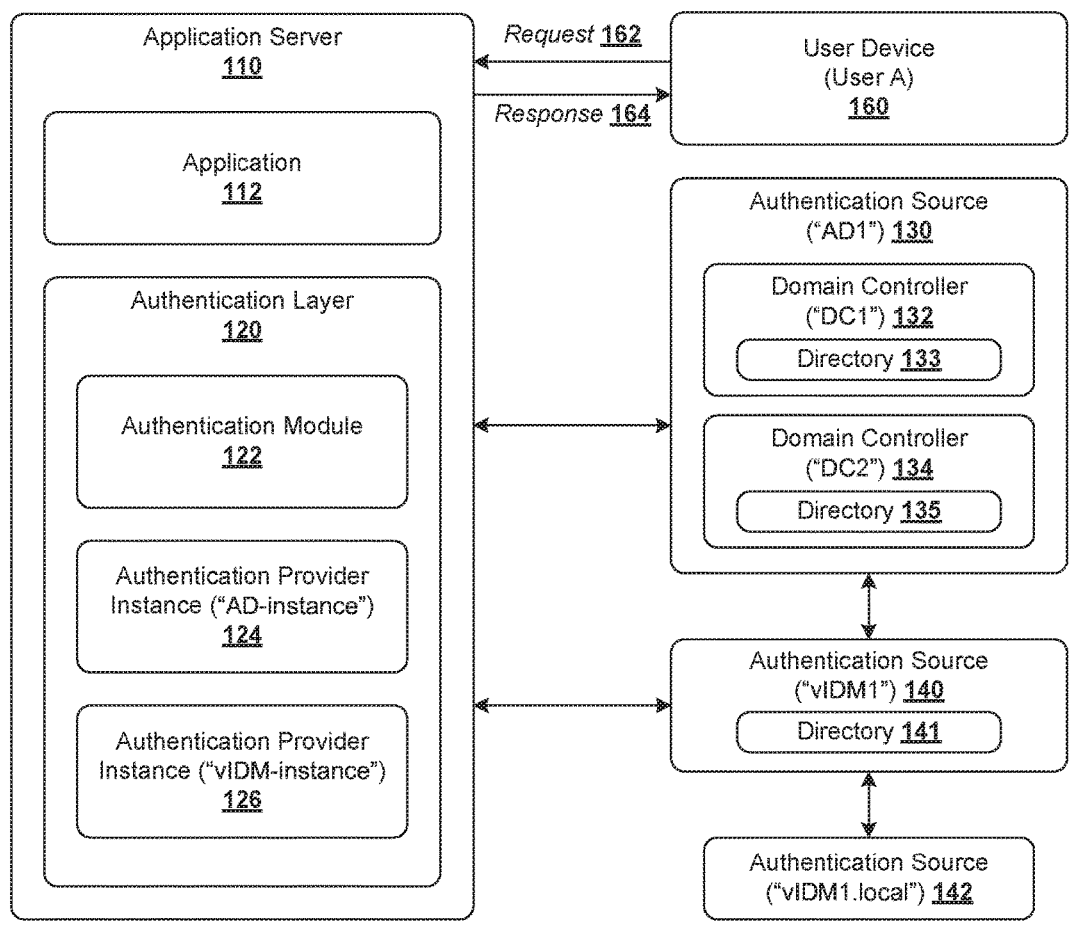
FIG. 1 is a schematic diagram illustrating an example network environment in which authentication source selection is performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of integrating with multiple authentication sources will now be described in more detail. FIG. 1 is a schematic diagram illustrating example network environment 100 in which performance-based authentication source selection is performed. It should be understood that network environment 100 may include additional and/or alternative components than that shown, depending on the desired implementation.

In example computing environment 100 in FIG. 1, an example computing device in the form of application server 110 implements or provides access to one or more applications 112 (one shown for simplicity). For example, application 112 may be a web-based, log data analysis application accessible by multiple user accounts, such as "User A" 160. In practice, "User A" 160 may be associated with a user operating a user device to connect with server 110 over a communications network.

Application server 110 may be implemented using one or more physical and/or virtual entities. In multitier client-server architecture, application server 110 may interact with one or more web servers, database servers, file servers, certificate servers, etc. Each user device may be any suitable computing device acting as a client, such as desktop computer, laptop, mobile phone, etc. A "resource" of application 112 may be any suitable element, such as a user interface (e.g., web page, graphical user interface); a user interface element (e.g., edit button) on the user interface; data relating to application 112; a combination thereof, etc.

Authentication layer 120 is configured to implement identity management functions, including authentication, access control, etc. The purpose of authentication is to verify a user's identity, such as by checking credential information of a user account during a login process. The credential information may include a user name, a password, etc. As used herein, the term "user account" (also known as an "identity") may refer generally to any suitable system object for which authentication is required, and may represent a user, computer, process, etc. Other ways for authentication may be through smart cards, voice recognition, fingerprints, etc.

The purpose of access control or authorization is to determine whether a user, once authenticated and successfully logged in, is permitted to access a resource of application 112 for security purposes. This protects resources from unauthorized users, thereby reducing or preventing activities that could lead to breach of security. Access control may be administered at a resource level by assigning resources with different permission sets, each representing an access level required. For example, a permission set may include read-only, write and full control permissions, etc.

In relation to authentication, authentication layer 120 implements authentication module 122 to receive request 162 to authenticate user account 160 during login process. Once request 162 is processed, response 164 is sent to indicate whether request 162 is successful or otherwise. To facilitate integration of multiple identity management solutions for external authentication, authentication layer 120 is configured with authentication provider instances 124 and 126. In particular, each "authentication provider instance" (also known as an "identity provider instance") represents an implementation of an authentication provider solution at application server 110, such as using application logic with a specific authentication source configuration instance within authentication layer 120.

Authentication provider instance 124/126 may be configured to implement any suitable identity management solution and connect to external authentication source(s). As used herein, the term "authentication source" (also known as "identity provider") may refer generally to any suitable entity capable of verifying credential information associated with a user account during an authentication process. In practice, an authentication source may be implemented using physical server(s) and/or virtual entity or entities in a virtualized computing environment.

In the example in FIG. 1, first authentication provider instance labelled "AD-instance" 124 is configured to implement Active Directory (a trademark of Microsoft Corporation). "AD-instance" 124 is associated with an external authentication source that is labelled "AD1" 130 and configured for a particular domain. The term "domain" may refer generally to a collection of objects within an Active Directory network. The domain may be identified by a Domain Name System (DNS) domain name (e.g., "innovators.vmware.com"). An object may represent a single user, group of users, hardware component, etc. A single domain may span multiple physical locations or sites, and be responsible for any suitable number of objects.

To provide high availability and fault tolerance, multiple domain controllers may be deployed, such as "DC1" 132 and "DC2" 134. For example, if "DC1" 132 fails, authentication may be performed using "DC2" 134. Also, the domain controllers may be situated in the same geographical location, or different geographical locations such as "DC1" 132 in North America and "DC2" 134 in Europe. Each domain controller 132/134 may maintain a "directory" 133/135 to store information relating to user accounts, groups, security models, domains, etc. During authentication, directory 133/135 may be queried to verify the relevant credential information and to fetch group membership information associated with a user account. Searches against directory 133/135 may be performed using suitable protocol, such as Lightweight Directory Access Protocol (LDAP), etc.

Authentication layer 120 is also configured with a second authentication provider instance labelled "vIDM-instance" 126 that implements a different solution, such as VMware's Identity Manager (vIDM) (a trademark of VMware, Inc.). "vIDM-instance" 126 relies on an external authentication source labelled "vIDM1" 140, which is connected to "vIDM1.local" 142 and "AD1" 130. In this example, authentication of local user accounts (e.g., username="abgar") may be performed by querying information from "vIDM1.local" 142.

On the other hand, authentication of Active Directory accounts (e.g., username="abgar@innovators.vmware.com" and authentication type="Active Directory") may be performed by interacting with "AD1" 130 for the associated domain (e.g., "innovators.vmware.com"), or using cached information stored in directory 141. In the latter case, directory 141 at "vIDM1" 140 may be configured to synchronize with directory 133 at "DC1" 132 and/or directory 135 at "DC2" 134 based on any suitable synchronization policy. Although not shown "vIDM1" 140 may connect to any other relevant systems, such as a one-time password (OTP) server for authentication purposes.

Conventionally, during a login process, authentication layer 120 provides a default authentication provider instance or allows the user to choose another from the list of authentication provider instances configured on the server 110. For example, to authenticate "User A" 160, authentication provider instance "AD-instance" 124 implementing Active Directory may be the default choice, and associated authentication source "AD1" 130 is used during authentication. However, in practice, "AD1" 130 may not be the ideal option due to various reasons, such as longer response time, hardware failure, network failure, high load, performance degradation, etc. In this case, the authentication process may take a long time or cannot be completed at all, which adversely affects the user's experience.

Authentication Source Selection

According to examples of the present disclosure, instead of merely relying on default settings, an authentication process may be improved by dynamically selecting authentication sources based on their performance. In the example in FIG. 1, when authenticating an Active Directory account, the performance of "DC1" 132 and "DC2" 134 may be compared with that of "vIDM1" 140 in order to facilitate a performance-based selection. In the following, "User A" 160 will be used as an example user account to be authenticated. Although Active Directory and vIDM are used as examples, any other suitable identity provider and/or management solutions may be used, such as other Single Sign-On (SSO) solutions, etc.

Figure 2:
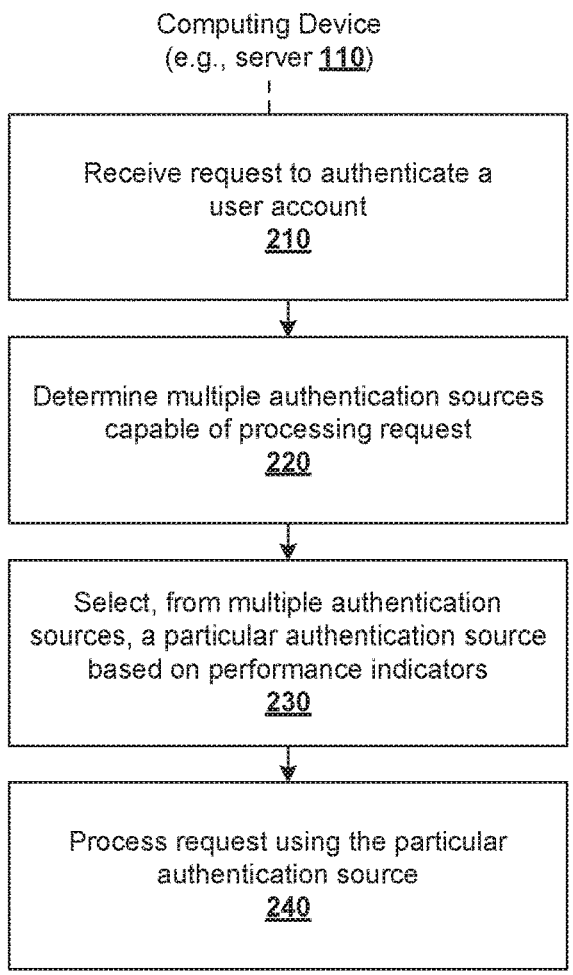
FIG. 2 is a flowchart of an example process for a computing device to select an authentication source.

In more detail, FIG. 2 is a flowchart of example process 200 for computing device 110 to select authentication source 130/140. Example process 200 may include one or more operations, functions, or actions illustrated by one or more blocks, such as 210 to 240. The various blocks may be combined into fewer blocks, divided into additional blocks, and/or eliminated depending on the desired implementation. In practice, example process 200 may be implemented by authentication layer 120 of server 110, such as using authentication module 122 and authentication provider instance 124/126.

At 210 in FIG. 2, request 162 to authenticate "User A" 160 is received by server 110. As discussed using FIG. 1, authentication is required prior to permitting "User A" 160 to access resources of application 112. Request 162 may include credential information associated with "User A" 160 that requires verification with authentication source 130/140, such as a user name, a password, etc. Request 162 may also specify or indicate a particular authentication type, such as Active Directory based on user name="abgar@innovators.vmware.com" of "User A" 160 or based on user's choice of authentication method for login.

At 220 in FIG. 2, multiple authentication sources that are capable of processing request 162 are determined. For example in FIG. 1, based on request 162 from "User A" 160, it is determined that authentication type="Active Directory." In this case, it is determined that "AD1" 130 (e.g., using "DC1" 132 or "DC2" 134) and "vIDM1" 140 are both capable of processing request 162.

At 230 in FIG. 2, a particular authentication source (e.g., "vIDM1" 140) is selected from multiple authentication sources based on their performance indicators. As used herein, the term "performance indicator" may refer generally to any suitable measurable parameter relating to an authentication process that allows comparison of multiple authentication sources. As will be described further using FIG. 3, the performance indicator may be a time value, such as a total duration required for logging in and fetching group membership information of a user account using a particular authentication source.

At 240 in FIG. 2, request 162 to authenticate "User A" 160 is processed using the selected authentication source (e.g., "vIDM1" 140) to determine whether authentication of "User A" 160 is successful or otherwise. Once request 162 is processed, server 110 may send response 164 to indicate the result of the authentication process.

In more detail, FIG. 3 is a schematic diagram illustrating example performance indicators of authentication sources 132, 134 140 in the example in FIG. 1. Benchmark information 310 includes information relating to authentication type (see 312), authentication source (see 314) and performance indicator (see 316). In the example in FIG. 3, since "AD1" 130 is associated with two domain controllers, the performance indicators for respective "DC1" 132 and "DC2" 134 are determined, such as duration=120 seconds using "DC1" 132 and duration=60 seconds using "DC2" 134. In the case of "vIDM1" 140, a shorter duration=10 seconds is required. For simplicity, the performance indicator of "vIDM1.local" 142 (not relevant to the authentication of Active Directory accounts) is not shown in FIG. 3.

In practice, the performance indicators for respective "DC1" 132, "DC2" 134 and in "vIDM1" 140 may be different for various reasons. For example in FIG. 3, "vIDM1" 140 is the fastest because it is configured to store and access cached information (e.g., Active Directory structures) in directory 141. Comparing "DC1" 132 and "DC2" 134, their performance indicator may be different because, for example, of the connection speed with server 110 (which may depend on the distance from server 110), etc.

The performance indicators may be compared to assign a priority level to each specific authentication source 132/134/140. Priority list 320 in FIG. 3 sets out a priority level (see 322) for each authentication source (see 326) associated authentication type (see 324). For example, the priority level assigned to "vIDM1" 140 is the highest; followed by "DC2" 134 of "AD1" 130; and "DC1" 132 of "AD1" 130 (i.e., lowest priority level). Although Active Directory is used as an example, priority list 320 may also include other authentication sources that are capable of handling different authentication types.

Using example process 200, the authentication process may be dynamically adapted to varying performance levels of different authentication sources 132, 134, 140. For example, although "AD1" 130 is the user-specified or default authentication source for Active Directory accounts, "vIDM1" 140 may be selected by server 110 because of its better performance indicator (e.g., shorter login duration). This way, server 110 is able to better utilize different authentication sources 132, 134, 140 to improve the processing speed, shorten the response time of server 110, improve the user's experience during the authentication process, etc. In some examples, this also facilitates optimal mixing and usage of authentication sources 132, 134, 140.

As will be described further using FIG. 4, an initial benchmarking process may be performed to determine an initial value of each performance indicator. Further, as will be described using FIG. 5, subsequent re-benchmarking may be performed to update the value of the performance indicator. Besides the duration values used in the example in FIG. 3, it should be understood that any other suitable performance indicator may be used. For example, prioritization may be made based on the cost of using authentication sources 132, 134, 140, etc. In this case, a more expensive authentication source may be assigned with a lower priority level, while a less expensive one is assigned with a higher priority level. Also, the performance indicator may also be a weighted combination of multiple parameters.

Initial Benchmarking

Figure 4:
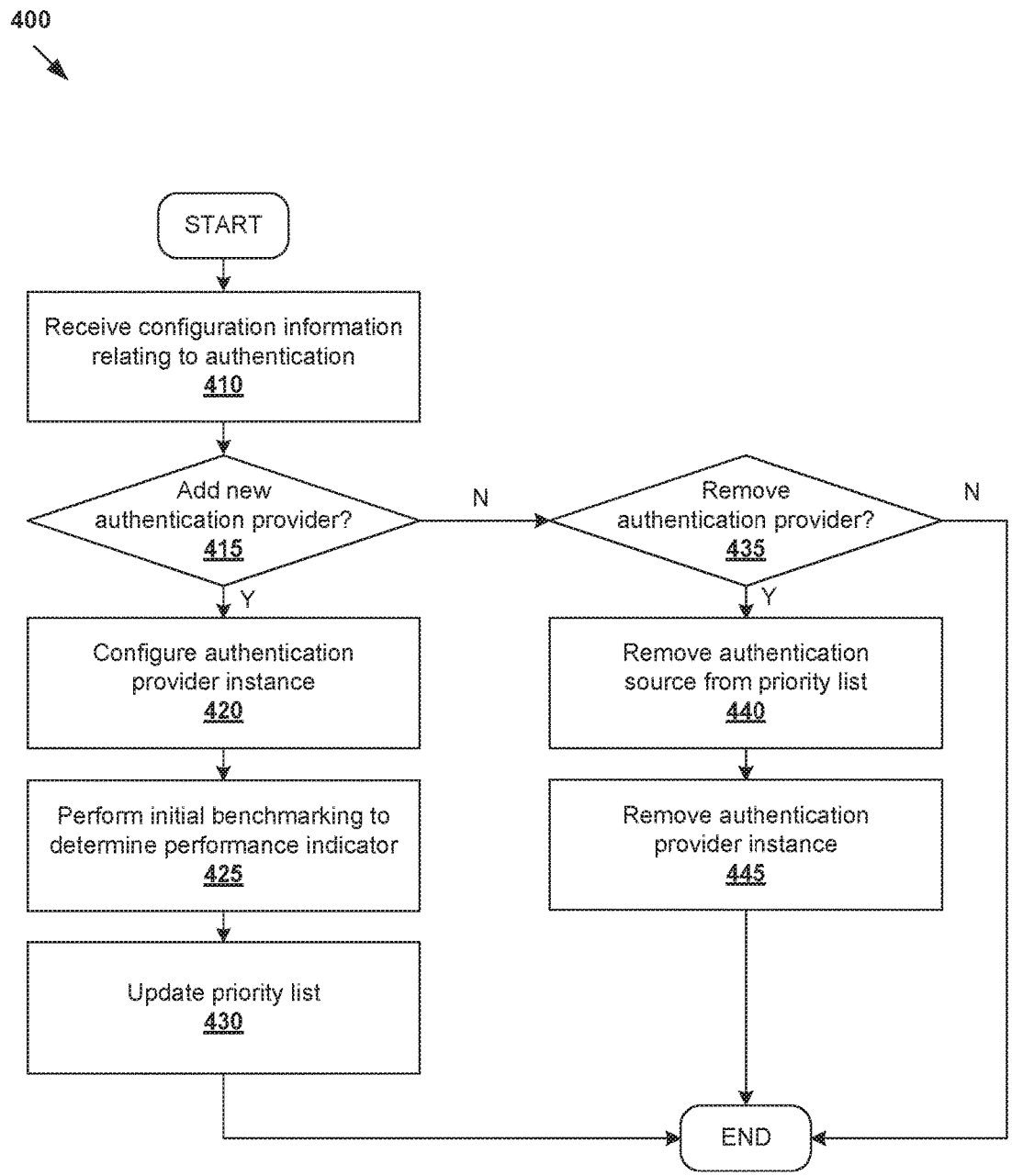
FIG. 4 is a flowchart of a detailed example process for a computing device to determine performance indicators for authentication source selection.

FIG. 4 is a flowchart of example process 400 for computing device 110 to determine performance indicators for authentication source selection. Example process 400 may include one or more operations, functions, or actions illustrated by one or more blocks, such as 410 to 445. The various blocks may be combined into fewer blocks, divided into additional blocks, and/or eliminated depending on the desired implementation. In practice, example process 400 may be implemented by authentication layer 120 of server 110, such as using authentication module 122 and authentication provider instance 124/126.

At 410 in FIG. 4, server 110 receives configuration information relating to authentication, such as information associated with the addition of a new authentication provider (see 415 to 430) or information removal of an existing authentication provider (see 435 to 450). For example, the configuration may be initiated by a network administrator manually (not shown in FIG. 1 for simplicity), programmatically using a script, etc. Addition and removal of authentication providers are discussed below, but it should be understood that other forms of configuration may be made.

At 415 and 420 in FIG. 4, when adding a new authentication provider, authentication layer 120 is configured with associated authentication provider instance. As explained using FIG. 1, the configuration may involve implementing an authentication provider instance as logic with a specific authentication source configuration instance within authentication layer 120. Connection testing may be performed during configuration. For example, configuration of "AD-instance" 124 may involve enabling support for Active Directory at server 110 and providing necessary information to connect with "AD1" 130, such as domain name (e.g., "innovators.vmware.com"), username, password, connection type (e.g., SSL), connection port, etc.

Similarly, configuration "vIDM-instance" 126 may involve enabling vIDM and providing necessary information to connect with "vIDM1" 140, such as host name, application programming interface (API) port, tenant name, vIDM tenant admin username, password, etc. As discussed using FIG. 1, "vIDM-instance" 126 is associated with "vIDM1" 140, which is configured to integrate with "AD1" 130 for authentication and management of Active Directory accounts. "vIDM-instance" 126 is also connected to "vIDM1.local" 142 via "vIDM1" 140 to authenticate vIDM local user accounts.

At 425 in FIG. 4, an initial benchmarking process is performed to determine an initial value of the performance indicator for the new authentication source being added. In one example, server 110 performs login into the external authentication source as part of its initial configuration process. The duration for this initial login may be measured and set as the initial benchmark value.

In the example in FIG. 3, the initial benchmarking process for "AD1" 130 may involve searching for "DC1" 132 and "DC2" 134 and determining a performance indicator for each domain controller 132/134. In practice, Active Directory may use DNS as a domain controller location mechanism and DNS domain naming conventions in the architecture of Active Directory domains. In this case, "DC1" 132 and "DC2" 142 may be searched or discovered using DNS query. The total duration for the login process (e.g., from authenticating to fetching group and other information related to the user account) may be measured and stored, such as 120 seconds for "DC1" 132 and 60 seconds for "DC2" 134. In the case of vIDM, the above logic may adapt to the per-node implementation of vIDM, which is enforced by vIDM's security model of replying back to the request originator node only. In the example in FIG. 3, benchmark information 310 is updated with its initial login duration of 10 seconds for "vIDM1" 140.

At 430 in FIG. 4, a priority level may be assigned to each authentication source 132/134/140 based on a comparison of the performance indicators. Using the example in FIG. 3 again, "vIDM1" 140 is assigned the highest priority level (i.e., highest ranking) because it has the shortest duration for the login process (e.g., from authenticating to fetching group and other information related to the user account). Benchmark information 310 and priority list 320 will be used during authentication to facilitate performance-based selection of authentication source 132/134/140.

At 435 and 440 in FIG. 4, when removing an existing authentication provider, benchmark information 310 and priority list 320 may be updated to remove entry or entries associated with "vIDM1" 140. The priority level of remaining authentication sources 132, 134 may change as a result. At 445 in FIG. 4, authentication layer 120 is updated to remove associated authentication provider instance, such as by uninstalling or disabling instance "vIDM-instance" 126.

In practice, the term "leaf provider" may be used to describe an authentication provider that is mapped to a single authentication source, such as "AD-instance" 124 mapped to "AD1" 130. The term "tree provider" may be used to describe an authentication provider that is mapped to multiple authentication sources, such as "vIDM1-instance" 126 mapped to "vIDM1" 140 and associated with "vIDM1.local" 142 and "AD1" 130. When a new leaf provider is configured according to 415 to 430 in FIG. 4 and the leaf provider's performance indicator is worse than that of a tree provider, the leaf provider may be added as a child node of the tree provider. When the leaf provider is removed according to 435 to 450 in FIG. 4, the leaf provider is simply removed from the tree provider. A new authentication source may also be automatically added to an existing tree authentication provider for speed and efficiency.

Authentication and Re-Benchmarking

Authentication according to example process 200 in FIG. 2 will be described further using FIG. 5. In particular, after performing the initial benchmarking according to example process 400 in FIG. 4, server 110 may rely on benchmark information 310 and priority list 320 to perform authentication source selection during authentication. In particular, a "re-benchmarking" process may be performed to update benchmark information 310 and priority list 320 such that authentication source 132/134/140 with the highest priority level is selected to process an authentication request. It should be understood that the best-performing authentication source may change over time.

Figure 5:
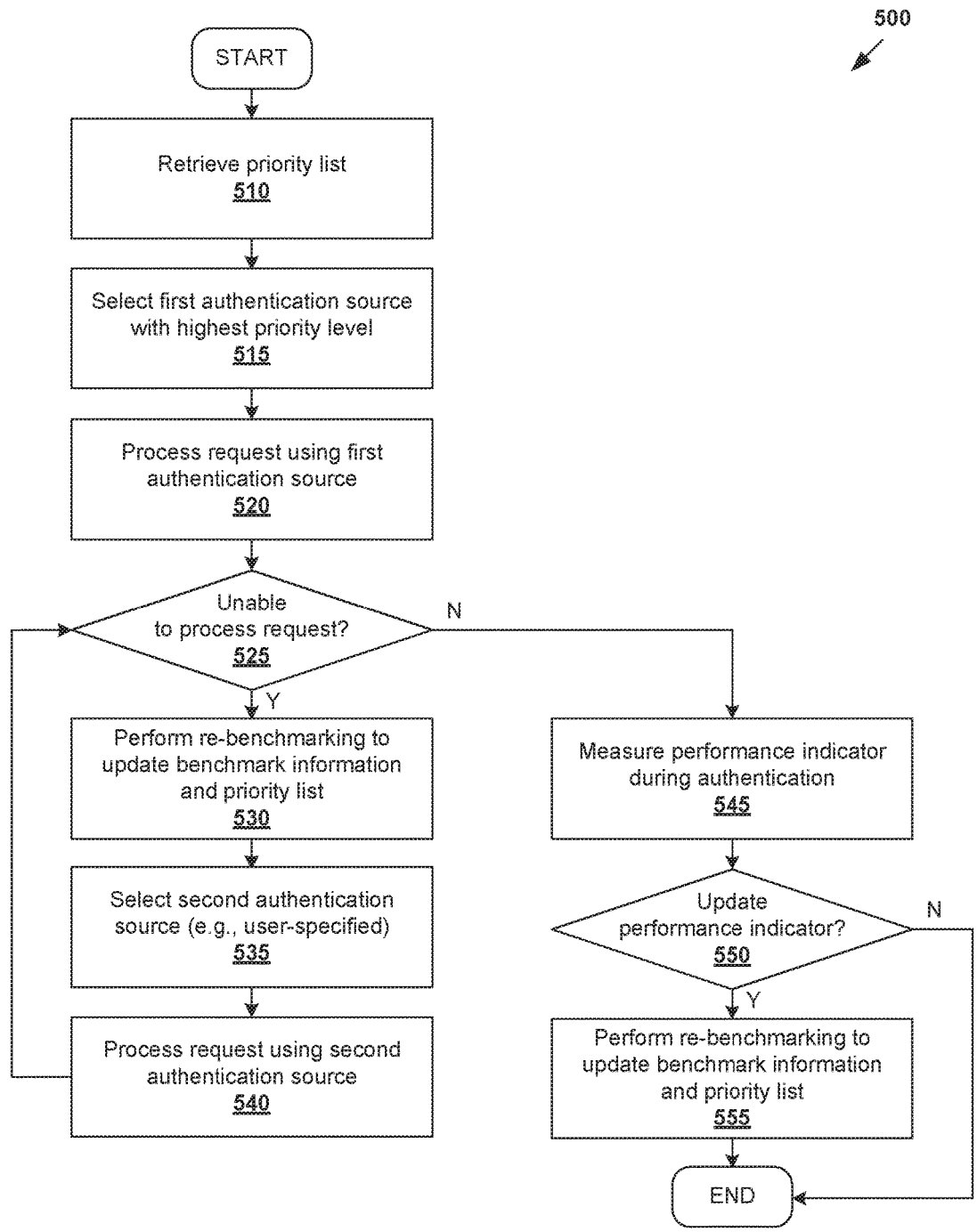
FIG. 5 is a flowchart of a detailed example process for a computing device to select an authentication source.

FIG. 5 is a flowchart of detailed example process 500 for computing device 110 to select authentication source 132/134/140. Example process 500 may include one or more operations, functions, or actions illustrated by one or more blocks, such as 510 to 555. The various blocks may be combined into fewer blocks, divided into additional blocks, and/or eliminated depending on the desired implementation. In practice, example process 500 may be implemented by authentication layer 120 of server 110, such as using authentication module 122 and authentication provider instance 124/126.

At 510 and 515 in FIG. 5, in response to receiving request 162 to authenticate "User A" 160, "vIDM1" 140 ("first authentication source") is selected based on the performance indicators of "DC1" 132, "DC2" 134 and "vIDM1" 140. Using the example in FIG. 3, block 515 may include retrieving priority list 320 associated with the authentication type="Active Directory," and selecting "vIDM1" 140 based on its highest priority level on priority list 320.

At 520 in FIG. 5, request 162 is processed using "vIDM1" 140 to determine whether request 162 is successful or otherwise. For example, "vIDM1" 140 may rely on cached information in directory 141 to process authentication requests. Alternatively or additionally, "vIDM1" 140 may interact with "DC1" 132 and/or "DC2" 142 to obtain the relevant information.

The example in FIG. 5 also provides a "failure fallback" mechanism in the event that the selected "vIDM1" 140 may be unable to process request 162. In this case, blocks 525 to 540 in FIG. 5 to process request 162 using a different authentication source. For example, this may occur when "vIDM1" 140 is offline or unavailable due to hardware failure, network failure, etc.

In particular, at 525 and 530 in FIG. 5, in response to determination that the selected "vIDM1" 140 is unable to process request 162, benchmark information 310 and priority list 320 may be updated to reduce the priority level of "vIDM1" 140 until it becomes available again (e.g., after a failure recovery).

At 535 and 540 in FIG. 5, since that "vIDM1" 140 is unable to process request 162, a different authentication source ("second authentication source") may be selected to authenticate "User A" 160. In one example, an authentication source associated with a user-specified authentication provider instance (e.g., "AD-instance" 124) may be selected for the subsequent retry. In another example, an authentication source with the next highest priority level on priority list 320 may be selected, such as "DC2" 134 at "AD1" 130.

At 525, 545 and 550 in FIG. 5, assuming that authentication using "DC2" 134 is successfully completed, server 110 determines whether to perform a re-benchmarking process to update benchmark information 310 and priority list 320 in FIG. 3. For example, at 545 in FIG. 5, the performance indicator (e.g., total duration) associated with the authentication using "DC2" 134 is measured. At 555 in FIG. 5, in response to determination that the performance indicator is higher than a threshold, re-benchmarking is performed.

In one example, the threshold may be set as a percentage (e.g., 120%) of the performance indicator of "DC2" 134. In this case, if the measured duration is more than threshold=120%×120=144 seconds, re-benchmarking is performed to update a value of the performance indicator of "DC2" 134 to the latest measured duration. This may affect the priority level of other authentication sources on priority list 320. Although an example is described here, it should be understood that the threshold may be set using any suitable approach depending on the desired implementation.

An "asynchronous retry" mechanism may also be used to detect the recovery of a particular authentication source. In the above example, since "vIDM1" 140 is previously the fastest authentication source, server 110 may try using "vIDM1" 140 in subsequent logins to check whether it is available again. Once recovery of "vIDM1" 140 is detected, re-benchmarking is performed to update benchmark information 310 and to increase its priority level in priority list 320. This way, "vIDM1" 140 may be selected again as soon as it becomes online again, instead of relying on the slower "DC1" 132 or "DC2" 134 of "AD1" 130. In practice, the asynchronous retry process may have any suitable limits, such as stopping after a predetermined number of retries (e.g., 3 retries) and/or waiting for a predetermined duration (e.g., 5 minutes) between retries.

In practice, any additional or alternative approach may be used to update the priority level of authentication source 132/134/140. In one example, authentication layer 120 may update the priority level based on an indication as to whether authentication source 132/134/140 is offline or online. This approach is suitable for cases when the system which is benchmarking logins is receiving information from authentication sources. For example, the "information" may be in the form of log events (e.g., application 112 is VMware's vRealize Log Insight), metrics (e.g., application 112 is VMware's vRealize Operations Manager (vROps)), messages, etc.

In this case, the prioritization may depend on whether server 110 receives log information from "DC1" 132 and "DC2" 134. If no log information is received within a pre-determined timeframe (e.g., the last 5 minutes), server 220 may deduce that "DC1" 132 is offline or not operating optimally (e.g., due to issues affecting its usual operation) based on the absence of log information, and assign a lower priority level to "DC1" 130. However, once "DC1" 132 resumes sending the log information, server 220 may deduce that "DC1" 132 is online and operating again and assign a higher priority level to "DC1" 132. In other words, prioritization may be made based on the deduced state of the authentication sources.

Computing Device

Figure 6:
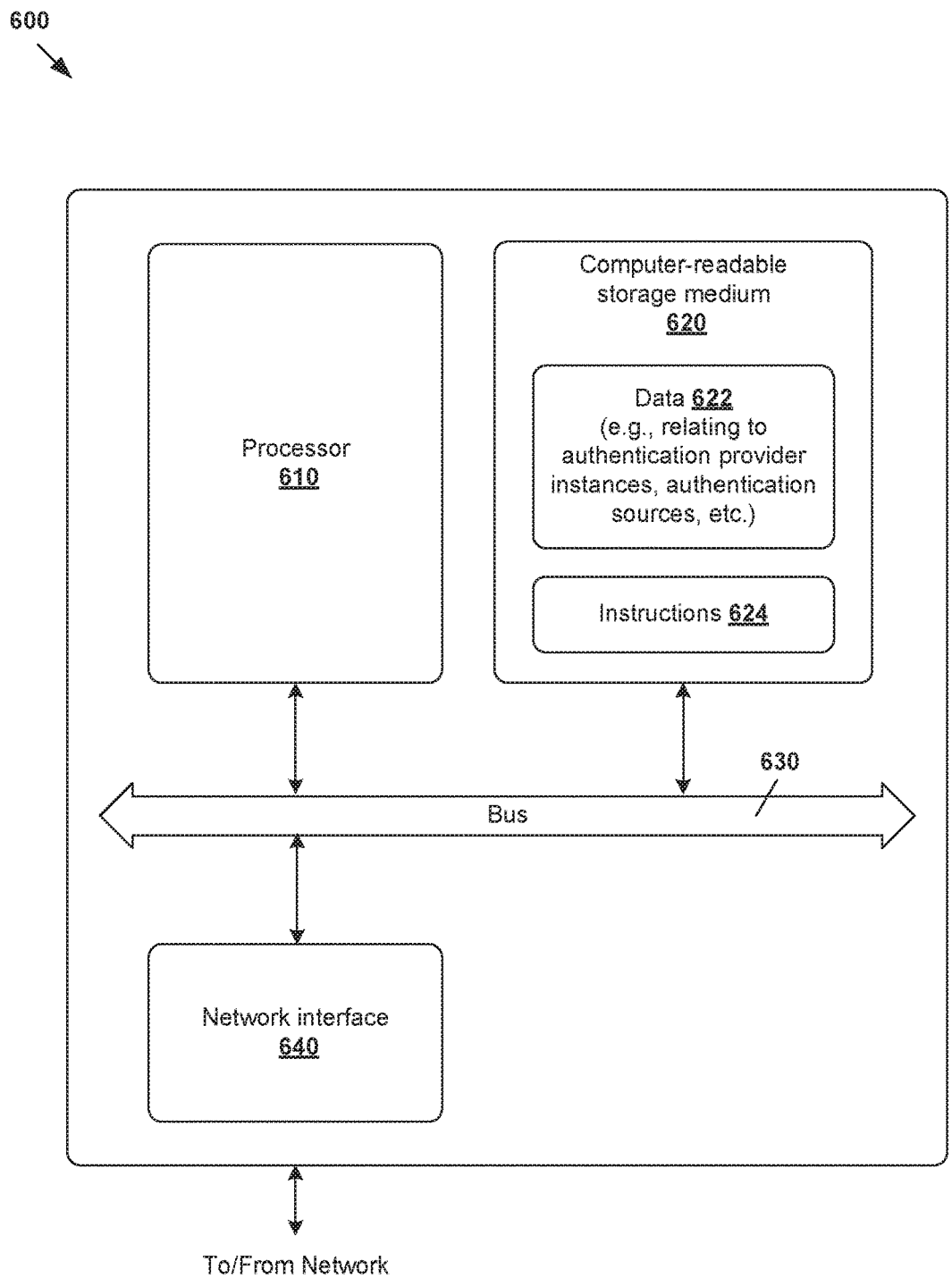
FIG. 6 is a schematic diagram illustrating an example computing device capable of acting as a server.

The above examples can be implemented by hardware (including hardware logic circuitry), software or firmware or a combination thereof. FIG. 6 is a schematic diagram illustrating example computing device 600 capable of acting as application server 110. Example computing device 600 may include processor 610, computer-readable storage medium 620, network interface 640, and bus 630 that facilitates communication among these illustrated components and other components.

Processor 610 is to perform processes described herein with reference to the drawings. Computer-readable storage medium 620 may store any suitable data 622, such as data relating to applications, authentication provider instances, authentication sources, etc. Computer-readable storage medium 620 may further store computer-readable instructions 624 ("program code") which, upon being executed by processor 610, cause processor 610 to perform processes described herein with reference to FIG. 1 to FIG. 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computing device to select an authentication source, the method comprising:
   benchmarking the time required to perform a login for each authentication source within a set of multiple authentication sources by logging into each authentication source wherein the login includes an authentication;
   comparing the time required to perform each login;
   assigning a priority level to each of the multiple authentication sources based on the comparison;
   subsequent to the benchmarking and comparing, receiving a request to authenticate a user account;
   selecting, by the computing device, a particular authentication source to process the request, wherein the particular authentication source is selected from the set of multiple authentication sources based on the priority level assigned to the particular authentication source, the priority level being the highest among the multiple authentication sources; and
   processing the request using the particular authentication source to authenticate the user account.

2. The method of claim 1, wherein the processing the request comprises:
   in response to determination that the particular authentication source, being a first authentication source, is unable to process the request, selecting a second authentication source from the multiple authentication sources to process the request; and processing the request using the second authentication source to authenticate the user account.

3. The method of claim 2, wherein the selecting the second authentication source comprises:
   selecting the second authentication source based on a priority level assigned to the second authentication source, the priority level being the second highest among the multiple authentication sources; or selecting the second authentication source to be a user-specified authentication source.

4. The method of claim 1, wherein the method further comprises:

in response to determination that the particular authentication source is unable to process the request, decreasing the priority level assigned to the particular authentication source.

5. The method of claim 4, wherein the method further comprises:
in response to determination that the particular authentication source becomes available, increasing the priority level assigned to the particular authentication source.

6. The method of claim 1, wherein the method further comprises:
based on an indication that the particular authentication source is offline or not operating optimally, decreasing the priority level assigned to the particular authentication source.

7. The method of claim 1, wherein the method further comprises:
based on an indication that the particular authentication source is offline or not operating optimally, performing a re-benchmarking process to update the time required to perform an authentication for each authentication process within the set of multiple authentication sources.

8. A non-transitory computer-readable storage medium comprising instructions, which when executed in a computing device, cause the computing device to perform a method to select an authentication source, the method comprising:
benchmarking the time required to perform a login for each authentication source within a set of multiple authentication sources by logging into each authentication source wherein the login includes an authentication;
comparing the time required to perform each login;
assigning a priority level to each of the multiple authentication sources based on the comparison;
subsequent to the benchmarking and comparing, receiving a request to authenticate a user account;
selecting, by the computing device, a particular authentication source to process the request, wherein the particular authentication source is selected from the set of multiple authentication sources based on the priority level assigned to the particular authentication source, the priority level being the highest among the multiple authentication sources; and
processing the request using the particular authentication source to authenticate the user account.

9. The non-transitory computer-readable storage medium of claim 8, wherein the processing the request comprises:
in response to determination that the particular authentication source, being a first authentication source, is unable to process the request, selecting a second authentication source from the multiple authentication sources to process the request; and processing the request using the second authentication source to authenticate the user account.

10. The non-transitory computer-readable storage medium of claim 9, wherein the selecting the second authentication source comprises:
selecting the second authentication source based on a priority level assigned to the second authentication source, the priority level being the second highest among the multiple authentication sources; or selecting the second authentication source to be a user-specified authentication source.

11. The non-transitory computer-readable storage medium of claim 8, wherein the method further comprises:
in response to determination that the particular authentication source is unable to process the request, decreasing the priority level assigned to the particular authentication source.

12. The non-transitory computer-readable storage medium of claim 11, wherein the method further comprises:
in response to determination that the particular authentication source becomes available, increasing the priority level assigned to the particular authentication source.

13. The non-transitory computer-readable storage medium of claim 8, wherein the method further comprises:
based on an indication that the particular authentication source is offline or not operating optimally, decreasing the priority level assigned to the particular authentication source.

14. The non-transitory computer-readable storage medium of claim 8, wherein the method further comprises:
based on an indication that the particular authentication source is offline or not operating optimally, performing a re-benchmarking process to update the time required to perform an authentication for each authentication process within the set of multiple authentication sources.

15. A computing device, comprising:
a processor; and
a non-transitory computer-readable medium having stored thereon program code that, upon being executed by the processor, cause the processor to:
benchmark the time required to perform a login for each authentication source within a set of multiple authentication sources by logging into each authentication source wherein the login includes an authentication;
compare the time required to perform each login;
assign a priority level to each of the multiple authentication sources based on the comparison;
receive a request to authenticate a user account;
select, by the computing device, a particular authentication source to process the request, wherein the particular authentication source is selected from the set of multiple authentication sources based on the priority level assigned to the particular authentication source, the priority level being the highest among the multiple authentication sources; and
process the request using the particular authentication source to authenticate the user account.

16. The computing device of claim 15, wherein program code for processing the request cause the processor to:
in response to determination that the particular authentication source, being a first authentication source, is unable to process the request, select a second authentication source from the multiple authentication sources to process the request; and processing the request using the second authentication source to authenticate the user account.

17. The computing device of claim 16, wherein program code for selecting the second authentication source cause the processor to:
select the second authentication source based on a priority level assigned to the second authentication source, the priority level being the second highest among the multiple authentication sources; or select the second authentication source to be a user-specified authentication source.

18. The computing device of claim 15, wherein the program code further cause the processor to:

in response to determination that the particular authentication source is unable to process the request, decrease the priority level assigned to the particular authentication source.

19. The computing device of claim 18, wherein the program code further cause the processor to:
in response to determination that the particular authentication source becomes available, increase the priority level assigned to the particular authentication source.

20. The computing device of claim 15, wherein the program code further cause the processor to:
based on an indication that the particular authentication source is offline or not operating optimally, decrease the priority level assigned to the particular authentication source.

21. The computing device of claim 15, wherein the program code further cause the processor to:
based on an indication that the particular authentication source is offline or not operating optimally, perform a re-benchmarking process to update the time required to perform an authentication for each authentication process within the set of multiple authentication sources.

* * * * *